Feb. 24, 1931.  O. THORSEN  1,793,651
AEROPLANE
Filed Aug. 19, 1929  3 Sheets-Sheet 3

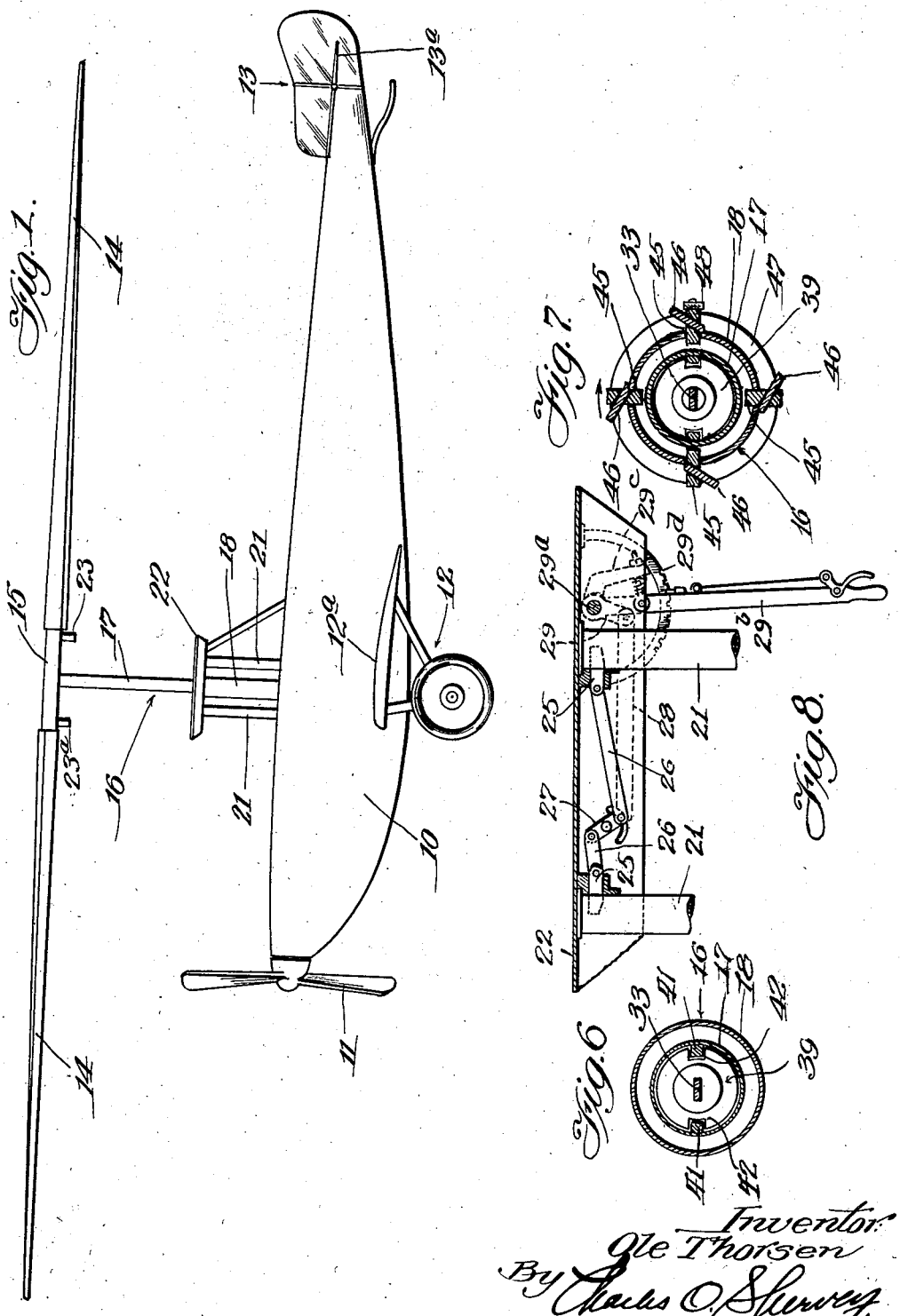

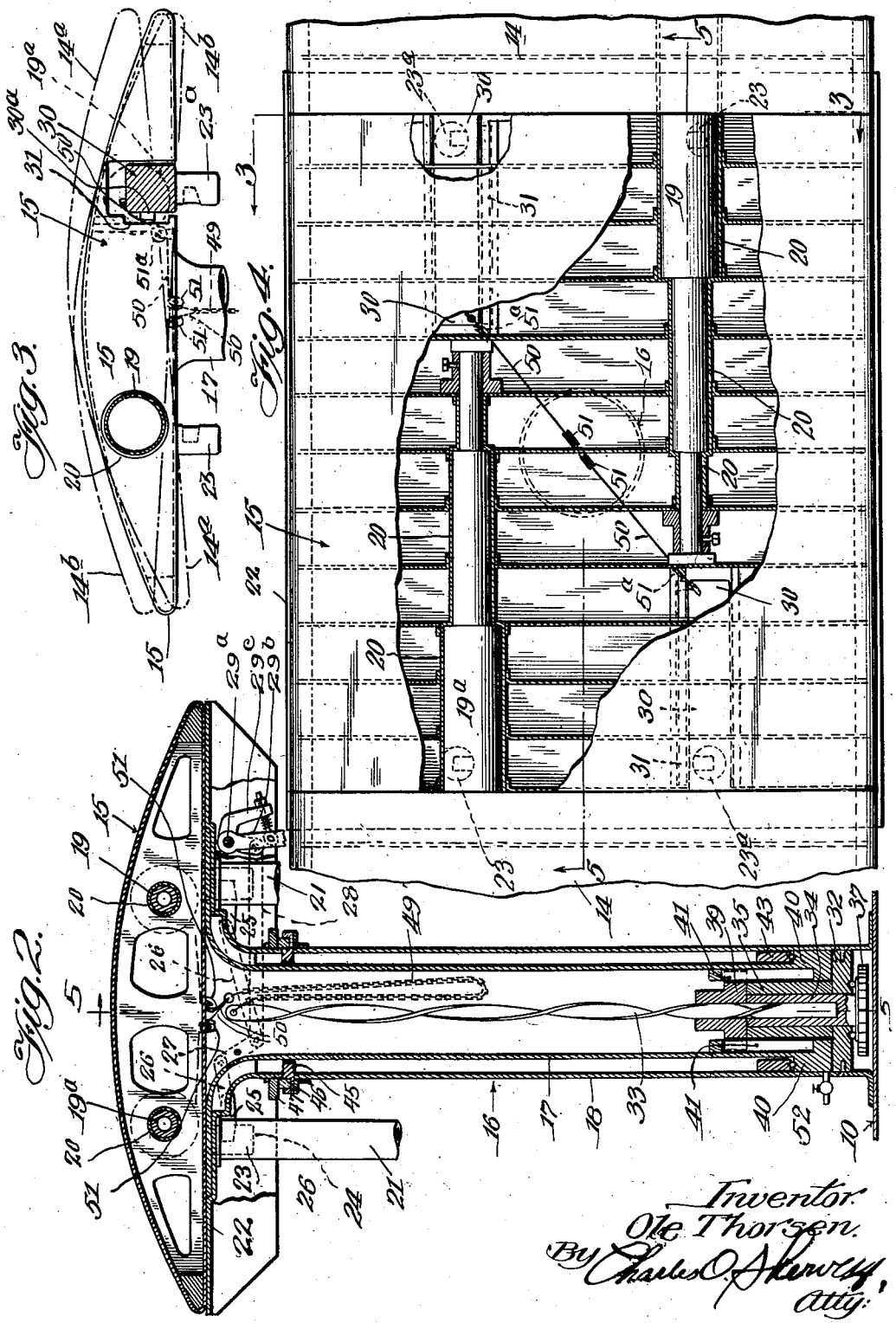

Inventor:
Ole Thorsen,
By Charles O. Sherry, Atty

Patented Feb. 24, 1931

1,793,651

UNITED STATES PATENT OFFICE

OLE THORSEN, OF CHICAGO, ILLINOIS

AEROPLANE

Application filed August 19, 1929. Serial No. 386,796.

This invention relates to aeroplanes, and its principal object is to provide means for retarding the fall of aeroplanes whereby they may be safely landed in case the motor or propeller becomes disabled. Another object is to provide means for preventing heavy shock or jar to the machine when alighting from a fall occasioned by a disabled motor or propeller. Another object is to provide the aeroplane with wings capable of serving in the nature of suspending members for the aeroplane in case of an emergency, whereupon the speed of the fall may be reduced sufficiently to prevent serious injury to the machine and its occupants.

With these and other objects and advantages in view, this invention consists in an aeroplane having wing members normally functioning as the wings of an aeroplane, but capable of rotation upon an axis extending at right angles to the length of the fuselage and serving to retard the speed at which the plane falls. It further consists in an aeroplane as above set forth in which the wing structure is capable of being extended above its normal position, whereby when rotating it will serve the purpose of a parachute for the machine.

It further consists in an aeroplane as above set forth having means for manually changing the pitch of the wings and also for automatically changing the pitch thereof. It further consists in an aeroplane having wings capable of rotating and provided with means for starting the rotation of the wings when released from their normal position.

It further consists in the several novel features of construction, arrangement and combination of parts hereinafter fully set forth and claimed.

The invention is clearly illustrated in the drawings accompanying this specification in which—

Figure 1 is a side elevation of an aeroplane embodying a simple form of the present invention, and showing the same with the wings thereof in a position occupied during the fall of the machine;

Fig. 2 is a detail fragmental vertical longitudinal section taken on the line 2—2 of Fig. 5, but showing the parts in the position occupied under normal conditions, certain parts being broken out to show certain locking members;

Fig. 3 is a detail fragmental section taken on the line 3—3 of Fig. 4;

Fig. 4 is a detail fragmental plan of the wing structure;

Fig. 6 is a detail horizontal section taken on the line 6—6 of Fig. 5;

Fig. 7 is a detail horizontal section taken on the line 7—7 of Fig. 5; and

Fig. 8 is a detail side elevation of certain locking mechanism for the wing structure.

Figure 5:
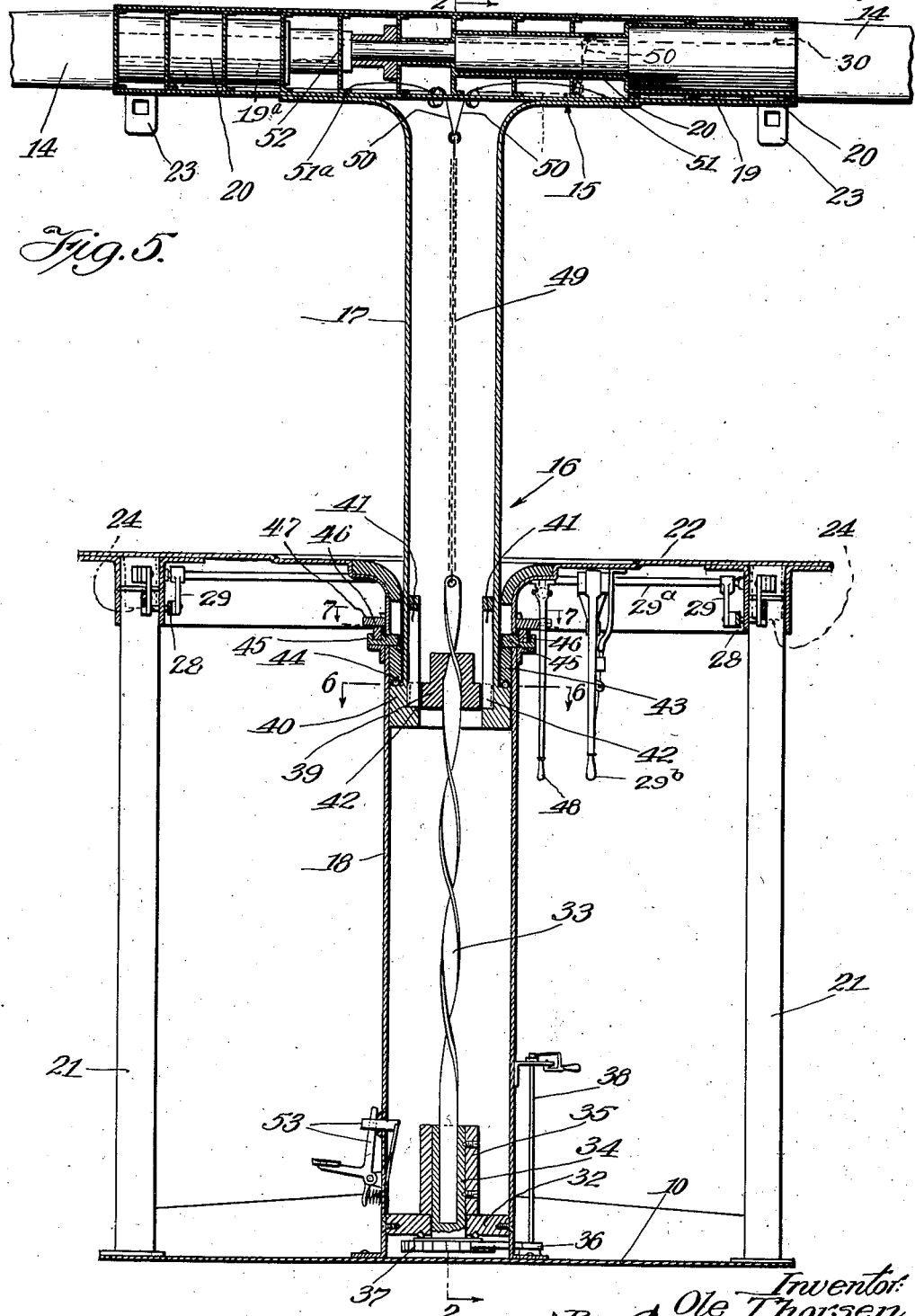
Fig. 5 is a detail fragmental cross section taken on the line 5—5 of Figs. 2 and 4, but showing the wing structure extended above the normal position occupied by it.

Referring to said drawings, the reference character 10 designates the aeroplane body or fuselage of conventional form, 11 designates the propeller and 12 the landing gear. As is customary, the usual rudder 13 and elevator 13ª are provided, and a motor (not shown) is employed for driving the propeller 11. The usual ailerons are hinged to short lower wings 12ª located below the main wings.

The wings of the aeroplane are illustrated at 14—14, and said wings are tiltably mounted upon a wing frame 15 which is supported by a tubular telescopic column 16 composed of tubular sections 17 and 18. The telescopic column 16 is in the nature of an extensible mast, which supports the wing structure, composed of the wings 14 and the wing frame 15. The telescopic section 17 of the mast is secured to the underside of the wing frame 15 and telescopes into the section 18 of the mast, and is capable of rotating therein. The wing frame 15 is practically of the same width as the wings 14 and forms continuations of said wings across the top of the fuselage.

Each wing 14 is tiltably mounted in the wing frame 15 on an axis extending parallel with the length of the wing, whereby each may be tilted into an inclined position relative to the normal position of the wing. As shown, each wing is provided with a journal or shaft 19 and 19ª, here shown as of stepped formation, and journaled in journal bearings 20 mounted in the wing frame 15. Obviously, any suitable form of swivel connections between the wing frame 15 and wings 14 may be employed in place of the one illustrated. The journal bearings 20 are disposed at the sides of the median line of the wing frame and wings, so that when the wings are released from their normal position, they may swing upward about their journals through a limited extent at opposite sides of the wing frame so as to assume the positions of two oppositely inclined planes, as will be hereinafter set forth.

Extending up from the fuselage 10 is a frame structure composed of four posts 21 which are grouped around the mast 16 and are connected at their upper ends by a horizontal frame member 22, which is a little longer in the span direction than the wing frame 15 in order to assist in holding the wings rigid. The wing frame 15 normally rests upon the frame member 22, as is seen in Fig. 2, and in this position of the wing frame, the wings are maintained in their normal position for sustaining the aeroplane in flight. Inasmuch as the entire wing structure, including the section 17 of the mast, is capable of revolving upon the axis of the mast, means are provided for normally preventing rotation of said wing structure and also for securing said wing structure in its normal position with respect to the fuselage.

As shown in the drawings, downwardly projecting lugs 23 are provided upon the underside of the wing frame 15, which lugs enter sockets 24 in the upper ends of certain of the posts 21 and thereby prevent relative rotation between the fuselage and wing structure. Inasmuch as the wing structure is capable of upward movement with respect to the fuselage, means are provided for locking the wing structure to the fuselage, and, as shown, said means comprise lock bolts 25 (see Fig. 2) guided in sockets upon the posts 21 and arranged to enter notches formed in the lugs 23. It will be observed that when the lugs 23 are contained in the sockets 24 and locked in place by the bolts 25, that the wing structure is rigidly held in place with respect to the fuselage in a plane extending at right angles thereto, as is customary in aeroplane craft.

Means are provided for retracting the bolts 25 for the purpose of releasing the wing structure from its locked position, and, conveniently, a link 26 is connected to each bolt 25 and the links on opposite sides of the structure are connected to a lever 27, and said lever 27 is connected through a link 28 with a crank arm 29 which is fastened to a rock shaft 29$^a$ that extends from side to side and has both arms 29 fastened to it. An operating lever 29$^b$, together with a spring pressed arm 29$^c$ fast on the rock shaft and a segment 29$^d$, provide means for actuating the rock shaft 29$^a$.

The spring serves to hold the lock bolts tightly in place. The wings 14 also are provided with lugs 23$^a$ which extend down from the projections or lugs 30 on the wings and are arranged to enter sockets 24 in the upper ends of certain of the posts 21 and are locked in place by bolts 25 and operating mechanism, similar to that described in connection with the locking mechanism for the wing frame, thereby providing means for holding the wings against angular movement upon their journals 19 during the normal flight of the machine.

Referring to Figs. 3 and 4, it will be observed that the wings have only a limited amount of movement upon their journals, said movement being limited by the flanges 30$^a$ on the projections or lugs 30 which enter notches 31 formed in the wing frame 15. Fig. 3 illustrates diagrammatically the angular positions taken by the two wings 14 when released, the wing designated by the dotted lines 14$^a$ having been swung upward about its journal 19 and the ring designated by the reference character 14$^b$ having been swung upward about its journal 19$^a$.

When the wing structure is released from its locked position on the fuselage while the aeroplane is in the fact of falling, the upward pressure of the air on the wing structure extends the mast, and the wings, having been released from their normal position, are tilted upward on their journals into the dotted line positions indicated in Fig. 3, in which position the wing structure is caused to rotate upon its axis as a result of the downward movement of the aeroplane. In order to insure the commencement of the rotation of the wing structure, means are provided for initially setting it into motion, and said means will now be described.

Journaled in a bearing block 32 secured in the lower end of the section 18 of the mast is a worm screw or spirally shaped member 33, the lower end of which is rigidly secured in a sleeve 34 which rotates in the journal bearing 32. Endwise movement of the worm screw 33 is prevented in one direction by a collar 35 which is fastened to the sleeve 34 and in the opposite direction by a ratchet wheel 37 and interposed ball bearings. Rotation of the worm screw in one direction is prevented by pawl and ratchet mechanism 36 and 37 which is arranged below the journal bearing 32. A crank and crank shaft 38 secured to the pawl 36 provides means for disengaging the pawl from the ratchet wheel to permit rotation of the worm screw 33.

Non-rotatably connected to the lower end of the upper section 17 of the mast is a nut 39 which has a spirally shaped opening therein through which the worm screw 33 passes and effectively engages with the nut, causing rotation of the nut and therewith the mast when the nut is moved lengthwise of the worm screw. The section 17 of the mast has a limited amount of endwise movement lengthwise of the nut 39, but is held against rotation relative thereto. As shown, the section 17 of the mast has a flanged collar 40 secured upon its lower end from which ribs or guide members 41 extend upward along the inner face of the section 17 and enter notches 42 formed in the sides of the nut 39.

The longitudinal movement of the section 17 of the mast relative to the nut is limited by the stop shoulders at the ends of the ribs 41. Said limited lengthwise movement of the section 17 of the mast relative to the nut is provided so as to permit the lugs 23, 23ᵃ of the wing structure to move vertically out of the sockets 24 during which interval of time the nut 39 remains ineffective for the purpose of rotating the wings. Under normal conditions, the nut 39 is at the upper end of the ribs or guide members 41 and the collar 40 is located close to the bearing block 32. During the initial upward movement of the section 17 of the mast, the nut 39 remains stationary until the lower ends of the ribs or guide members 41 engage the nut, whereupon it commences its rotatory movement about the worm screw 33, thereby starting rotation of the wings. Above the collar 40 is a sleeve 43 between which are ball bearing members 44.

Adjacent the upper end of the section 18 of the mast are stop members 45 which limit the upward movement of the section 17 of the mast. Said stop members project into the interior of the section 18 of the mast and are engaged by the sleeve 43 when the wing structure reaches its first extended position, as is clearly indicated in Fig. 5. Cam blocks 46 (see Fig. 7) mounted upon a ring 47 engage cam faces on the stop members 45, and when said ring 47 is partially rotated in the proper direction, the stop members 45 are retracted, thereby permitting further endwise movement of the section 17 of the mast. A lever 48 is provided for actuating the ring 47.

The purpose of providing for the extra endwise movement of the section 17 of the mast is to cause the wings to be deflected in a reverse direction from that illustrated in Fig. 3, and this is done when the aeroplane reaches a position close to the earth and it is desired to further retard its downward fall. Secured to the upper end of the worm screw 33 is a flexible connection 49, such as a chain or cable, which flexible connection is divided at its upper end into two flexible connections 50 which are trained around pulleys 51 and 51ᵃ and run to the projections or lugs 30 on the wings.

It will be observed that when the section 17 of the mast moves upward from the position shown in Fig. 5, where the flexible connections 49 and 50 are fairly taut, the projections or lugs are drawn down and the wings are thereby tilted into position reverse with respect to the dotted line positions indicated in Fig. 3. In such positions they form to all intents and purposes the blades of a propeller, which, because of the inertia imparted to it during the downward falling movement of the aeroplane, continues to rotate in the same direction as before, tending to draw the aeroplane upward against the action of gravity, thereby further breaking the fall of the aeroplane during its final movement towards the earth.

At the bottom of the section 18 of the mast is a detent 53 which projects into the interior of said section and arrests downward movement of the mast and the wing structure carried thereby. This is for the purpose of arresting downward movement of the wing structure at a point above the frame member 22 where said wing structure may be slowly rotated so as to bring the lugs 23 and 23ᵃ into regsiter with the sockets 24. By retracting the detent 53, the section 17 of the mast and the wing structure carried thereby are permitted to move to their lowermost position with the lugs 23 and 23ᵃ entered into the sockets 24, in which position the wing structure is locked to the fuselage by throwing the bolts 25 into the notches of the lugs 23 and 23ᵃ.

In operation, with the wing structure locked in place, the aeroplane is manœuvred, in the usual manner. In the event of an emergency, as, for instance, in case the motor or propeller fails to function and the aeroplane commences to drop, the lever 29ᵇ is manipulated, and the lock bolts 25 retracted, thereby permitting the mast to extend. During the initial upward movement of the upper section of the mast, the nut 39 remains stationary which allows the lugs 23 and 23ᵃ to move out of the sockets 24, and during the remainedr of the upward movement of the upper section of the mast, the nut 39 and therewith said upper section and the wing structure are caused to rotate by reason of the screw connection between the worm screw 33 and nut 39. When the lugs 23 and 23ᵃ have been withdrawn from the sockets 24, upward pressure of the air on the wings causes them to tilt upwardly in opposite directions, and during the fall of the aeroplane, they are caused to rotate and offer resistance to the falling action of the plane.

When approaching the surface of the earth, the lever 48 is manipulated and the stop members 45 retracted, thereby permitting the final endwise movement of the mast and causing the wings to be deflected into the reverse directions. By reason of the continued rotation of the wings, due to the momentum which they have acquired during the fall of the plane, said wings now act as the blades of a propeller and tend to draw the plane upward, thereby further retarding its downward movement. After the plane has landed, the wing structure is returned to normal position, as has been above set forth.

It will be observed that the lower end of the section 18 of the mast is closed, and said section 18 being filled with air, acts as a cushion for the other section 17 when the latter is lowered, thereby cushioning its fall. If desired, an air valve 52 may be provided at the lower end of the section 18 to permit the escape of air. The wings 14 are preferably made relatively long and are of the usual cross section employed in standard wings. With the use of relatively long wings tilted at a very few degrees, the wings, when rotating, act in the nature of a parachute.

The safety device above described may also be used whenever desired, as, for instance, when landing the plane at places where there is no room for the plane to coast after landing.

In order to facilitate transportation of the plane, one of the wings may be taken off and the other one turned in a rearward direction.

I claim as new, and desire to secure by Letters Patent:

1. In an aeroplane, the combination with an aeroplane body, of an extensible mast supported thereby, one section of which is mounted for rotation, a wing structure, including the sustaining wings of the aeroplane carried by the rotative section of said mast, said mast when extended acting to hold the wing structure above its normal position, releasable means for locking said wing structure in normal position, and means for retaining the rotative section of the mast in its extended position.

2. In an aeroplane, the combination with an aeroplane body, of an extensible mast supported thereby, one section of which is mounted for rotation, a wing structure carried by the rotative section of the mast and having tiltable wings, means for initially imparting rotation to said wing structure, releasable means for locking said wing structure in normal position, and means for retaining the rotatable section of the mast in extended position.

3. In an aeroplane, the combination with an aeroplane body, of an extensible mast supported thereby, one section of which is mounted for rotation, a wing structure comprising a wing frame carried by the rotative section of the mast and wings tiltably mounted on said wing frame and having a limited amount of angular movement with respect thereto, means for initially imparting rotation to said wing structure, releasable means for locking said wing structure and therewith the wings in normal position, and means for retaining said rotatable section of the mast in its extended position.

4. In an aeroplane, the combination with an aeroplane body, of an extensible mast supported thereby, one section of which is mounted for rotation, a wing structure comprising a wing frame carried by the rotative section of the mast and wings tiltably mounted on said wing frame and having a limited amount of angular movement with respect thereto, a worm screw mounted in one section of the mast, and a nut on said worm screw mounted in the other section of the mast, releasable means for locking said wing structure in normal position, and means for retaining said rotatable section of the mast in extended position.

5. In an aeroplane, the combination with an aeroplane body, of an extensible mast supported thereby and composed of telescopic sections, one of which is mounted for rotation relative to the other, a wing structure comprising a wing frame carried by the rotative section of the mast and wings tiltably mounted on said wing frame and having a limited amount of angular movement with respect thereto, releasable means for locking said wing structure in normal position, a worm screw mounted in one section of the mast, a nut upon said worm screw mounted upon the other section of the mast and having a limited amount of endwise movement relative thereto, and means for retaining the rotatable section of the mast in its extended position.

6. In an aeroplane, the combination with an aeroplane body, of an extensible mast supported thereby and composed of telescopic sections, one rotatably mounted in the other, a wing structure comprising a wing frame carried by the rotative section of the mast, wings tiltably mounted on said wing frame and having a limited amount of angular movement with respect thereto, means for changing the pitch of said wings, releasable means for locking said wing structure in normal position, and means for retaining the rotatable section of the mast in its extended position.

7. In an aeroplane, the combination with an aeroplane body, of an extensible mast supported thereby and composed of telescopic sections, one rotatably mounted with respect to the other and having a limited amount of lengthwise movement with respect thereto, means for retaining said rotative section of the mast in its collapsed and extended positions, a wing structure comprising a wing frame carried by the rotative section of the mast, and wings tiltably mounted on said wing frame and having a limited amount of angular movement with respect thereto.

8. In an aeroplane, the combination with an aeroplane body, of an extensible mast supported thereby and composed of telescopic sections, one rotatably mounted with respect to the other and having a limited amount of lengthwise movement with respect thereto, means for retaining said rotative section of the mast in its collapsed and extended positions, a wing structure comprising a wing frame carried by the rotative section of the mast and wings tiltably mounted on said wing frame and having a limited amount of angular movement with respect thereto, and means for changing the pitch of the wings.

9. In an aeroplane, the combination with an aeroplane body, of an extensible mast supported thereby and composed of telescopic sections, one rotatably mounted with respect to the other and having a limited amount of lengthwise movement with respect thereto, means for retaining said rotative section of the mast in its collapsed and extended positions, a wing structure comprising a wing frame carried by the rotative section of the mast and wings tiltably mounted on said wing frame and having a limited amount of angular movement with respect thereto, and means controlled by the movement of the rotatable section of the mast for changing the pitch of the wings.

10. In an aeroplane, the combination with an aeroplane body having an upstanding structure, of an extensible mast, one member of which is rotatably mounted in the other, a wing structure comprising a wing frame and wings tiltably mounted thereon, locking lugs depending from said wing frame and wings and entering sockets in said upstanding structure, locking bolts carried by said upstanding structure and arranged to lockingly engage said lugs, and means for retracting said locking bolts.

11. In an aeroplane, an extensible mast having rotatable wings thereon, one section telescoping into the other and acting as a plunger, and the other section having an air chamber co-operating with the inner plunger section to cushion the latter when being lowered.

OLE THORSEN.